United States Patent
Lee

(10) Patent No.: US 12,377,828 B2
(45) Date of Patent: Aug. 5, 2025

(54) ELECTRONIC PARKING BRAKE SYSTEM AND SAFETY CONTROL METHOD THEREOF

(71) Applicant: HL MANDO CORPORATION, Pyeongtaek-si (KR)

(72) Inventor: Yongwoo Lee, Anseong-si (KR)

(73) Assignee: HL MANDO CORPORATION, Pyeongtaek si (KR)

(*) Notice: Subject to any disclaimer, the term of this patent is extended or adjusted under 35 U.S.C. 154(b) by 349 days.

(21) Appl. No.: 17/970,832

(22) Filed: Oct. 21, 2022

(65) Prior Publication Data
US 2023/0129690 A1    Apr. 27, 2023

(30) Foreign Application Priority Data
Oct. 27, 2021    (KR) .................. 10-2021-0144892

(51) Int. Cl.
*B60T 8/88* (2006.01)
*B60T 13/74* (2006.01)
*B60T 17/22* (2006.01)

(52) U.S. Cl.
CPC ............ *B60T 8/885* (2013.01); *B60T 13/741* (2013.01); *B60T 17/22* (2013.01); *B60T 2270/413* (2013.01)

(58) Field of Classification Search
CPC ...... B60T 13/741; B60T 17/22; B60T 17/221; B60T 2270/402; B60T 2270/413; B60T 8/885
See application file for complete search history.

(56) References Cited

U.S. PATENT DOCUMENTS

| | | | |
|---|---|---|---|
| 7,937,194 B2 * | 5/2011 | Nasr ..................... | B60W 10/08 303/174 |
| 9,744,950 B1 * | 8/2017 | Lemmer ............... | B60T 13/588 |
| 10,766,469 B2 * | 9/2020 | Takae ....................... | B60T 7/12 |
| 10,988,121 B2 * | 4/2021 | Burt ................ | B60W 30/18118 |
| 2004/0201270 A1 * | 10/2004 | Suzuki ................. | B60T 13/741 303/20 |

(Continued)

FOREIGN PATENT DOCUMENTS

| CN | 105059282 A | * | 11/2015 |
|---|---|---|---|
| CN | 110254414 A | * | 9/2019 |

(Continued)

*Primary Examiner* — Babar Sarwar
(74) *Attorney, Agent, or Firm* — LEE, HONG, DEGERMAN, KANG & WAIMEY

(57) ABSTRACT

An electronic parking brake system includes: a first electronic parking brake (EPB) including a first electric motor configured to provide a first braking torque to a first wheel of a vehicle; a second EPB including a second electric motor configured to provide a second braking torque to a second wheel of the vehicle; a first controller configured to control the first electric motor; and a second controller configured to control the second electric motor, wherein the first controller is configured to transmit a first signal to the second controller at predetermined intervals, and the second controller is configured to increase the second braking torque provided to the second wheel, based on the first signal not being received from the first controller.

12 Claims, 9 Drawing Sheets

(56) References Cited

U.S. PATENT DOCUMENTS

| | | | |
|---|---|---|---|
| 2009/0198427 A1* | 8/2009 | Christopher Jackson | ................... B60T 13/662 188/1.11 R |
| 2010/0318256 A1* | 12/2010 | Breuer | ...................... B60T 7/22 701/31.4 |
| 2012/0205202 A1* | 8/2012 | Baehrle-Miller | ..... B60T 13/588 188/106 P |
| 2015/0217739 A1* | 8/2015 | Blattert | ................... B60T 8/885 701/70 |
| 2016/0109024 A1* | 4/2016 | Capito | .................. F16H 63/486 701/69 |
| 2017/0106848 A1* | 4/2017 | Ritter | .................... B60T 13/662 |
| 2018/0043867 A1* | 2/2018 | Lemmer | ............... B60T 13/662 |
| 2018/0148028 A1* | 5/2018 | Baehrle-Miller | ..... B60T 13/588 |
| 2018/0154875 A1* | 6/2018 | Takahashi | .................. B60L 7/18 |
| 2018/0208170 A1* | 7/2018 | Hanzawa | ................ F16D 65/18 |
| 2020/0262399 A1* | 8/2020 | Yokoyama | ................ B60T 8/00 |
| 2021/0024044 A1* | 1/2021 | No | ........................ B60T 13/662 |
| 2023/0042441 A1* | 2/2023 | Fujita | .................... B60T 13/741 |

FOREIGN PATENT DOCUMENTS

| | | | |
|---|---|---|---|
| CN | 115431948 A | * | 12/2022 |
| JP | 2004-314756 A | | 11/2004 |
| JP | 6575175 B2 | | 9/2019 |
| WO | WO-2017002450 A1 | * | 1/2017 |
| WO | WO-2023065709 A1 | * | 4/2023 |

\* cited by examiner

[FIG. 1]
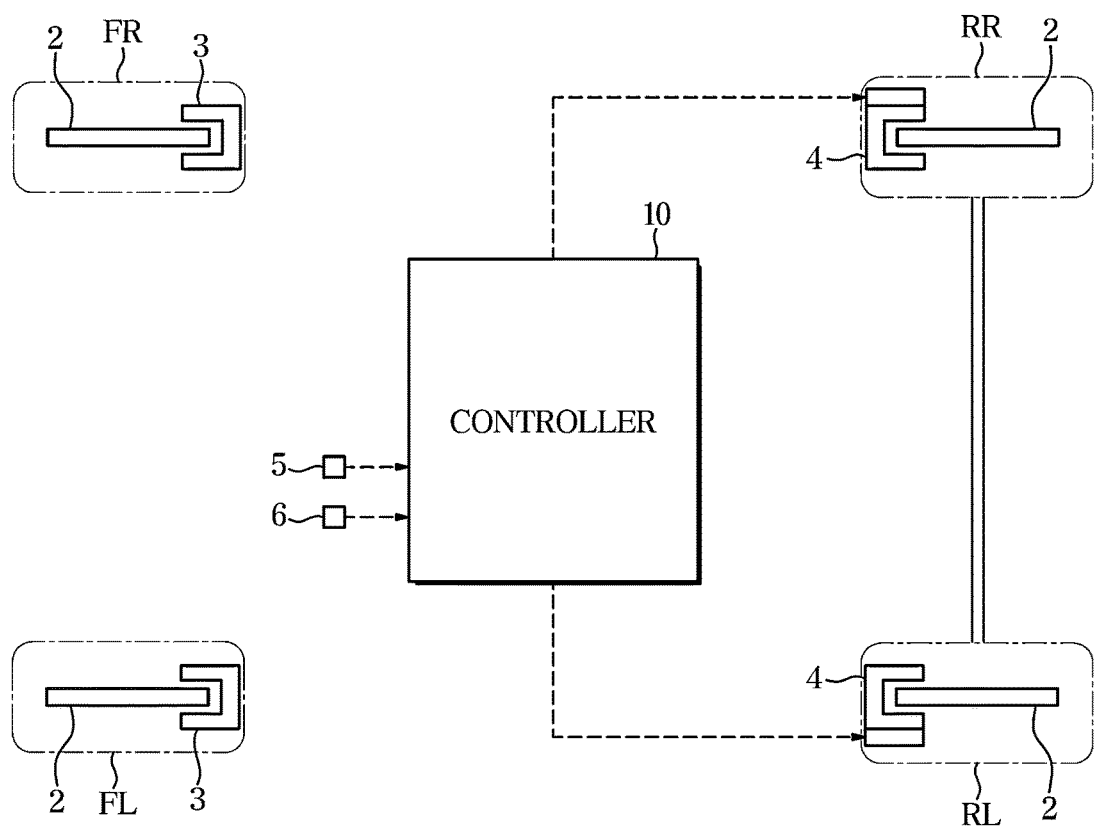

[FIG. 2]
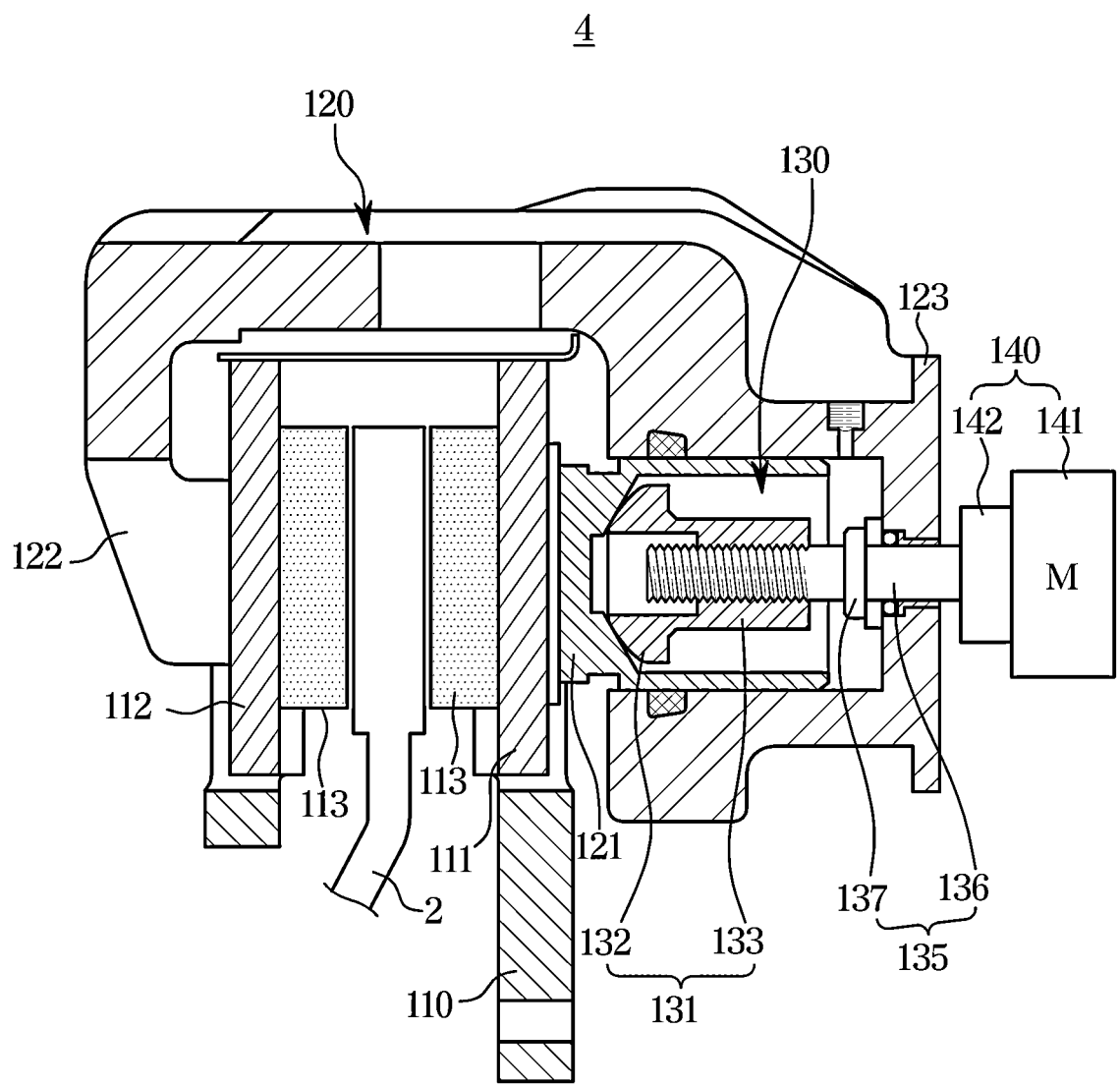

[FIG. 3]
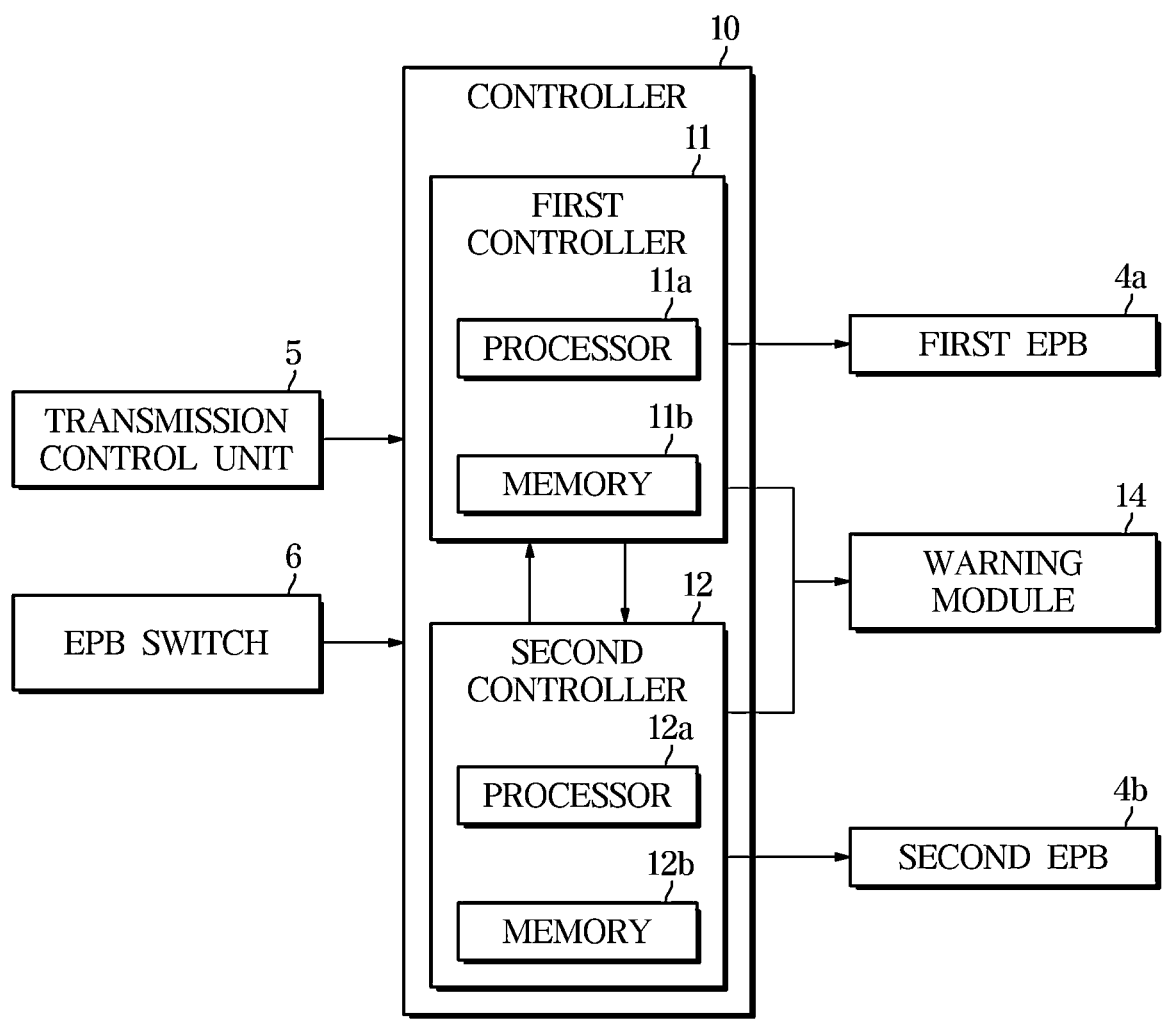

[FIG. 4]
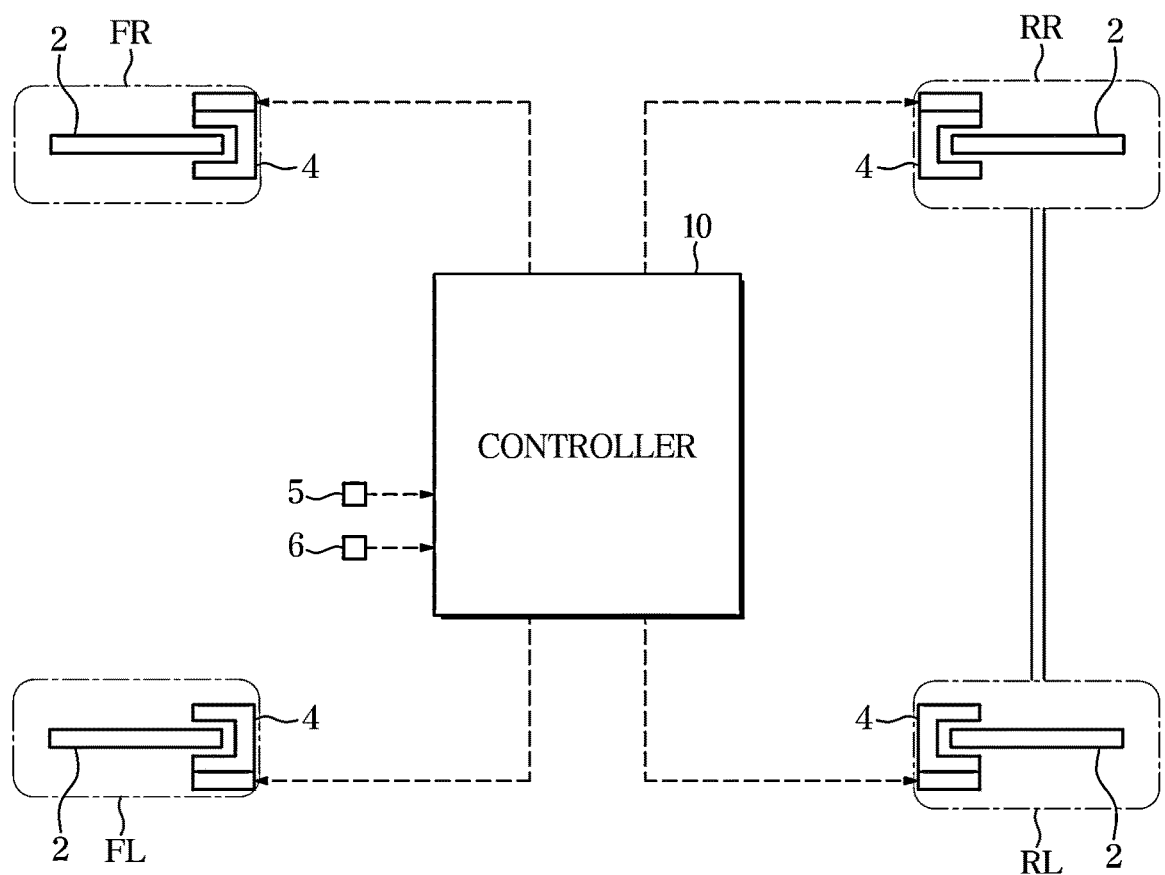

[FIG. 5]
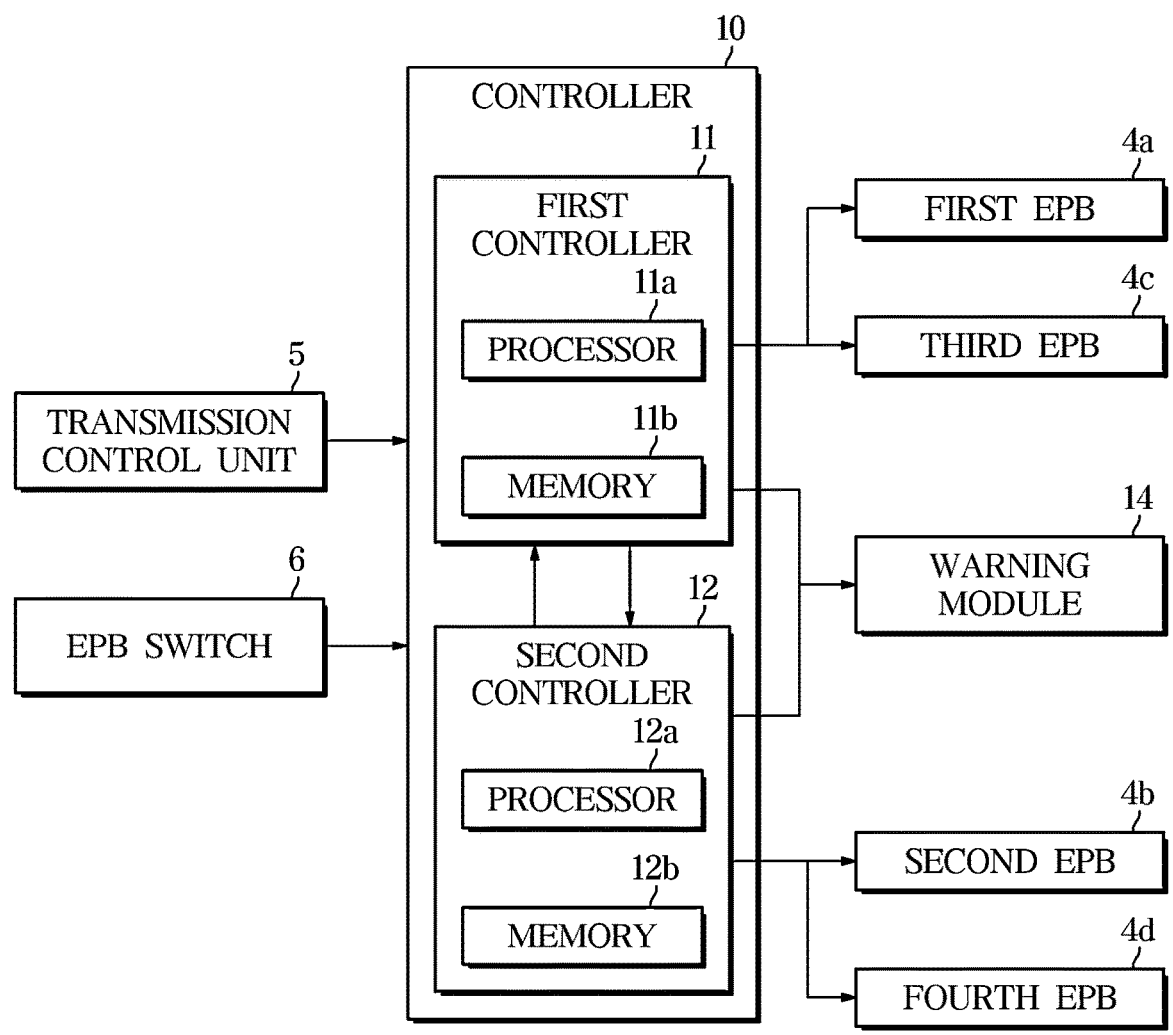

[FIG. 6]
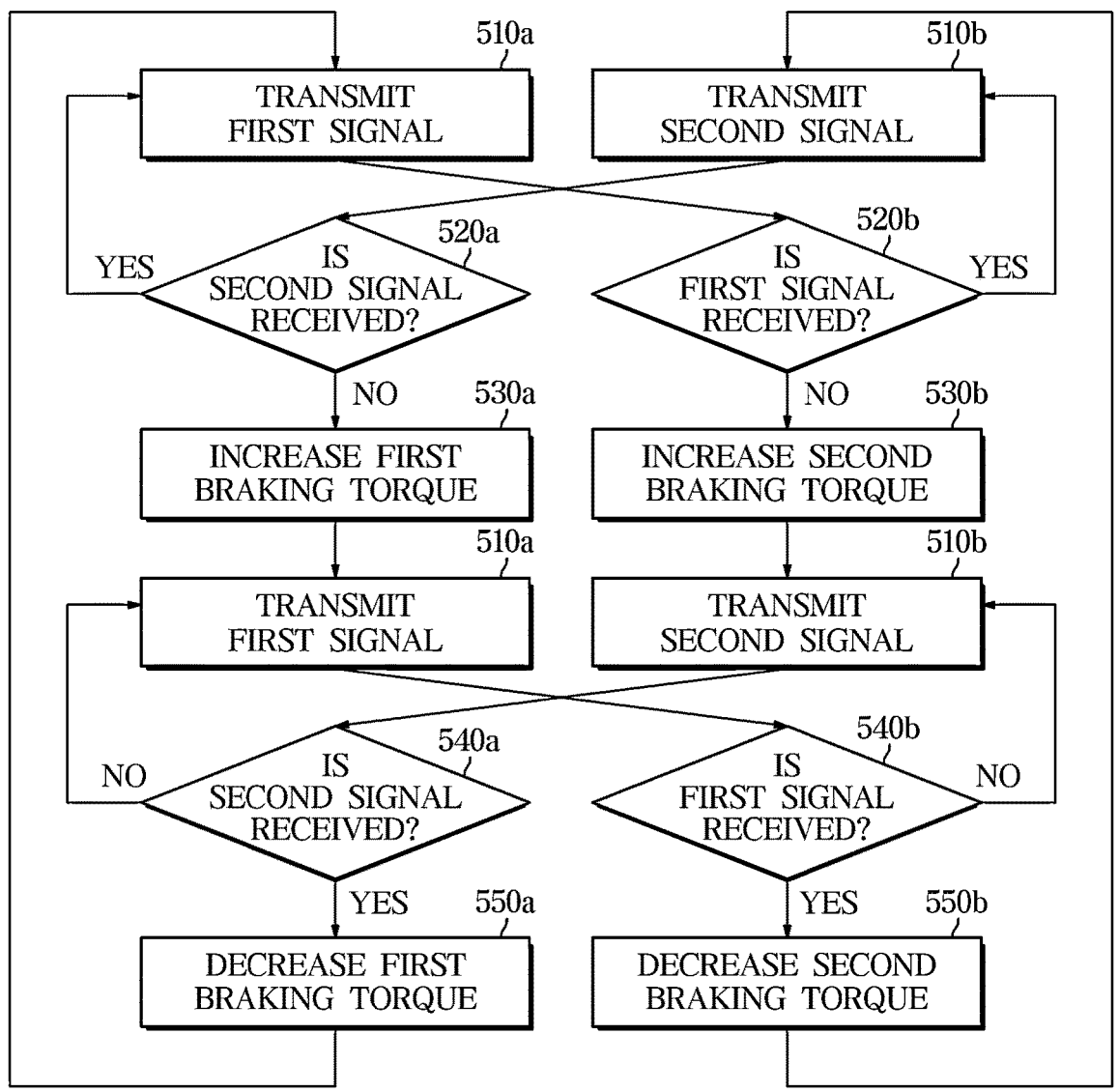

[FIG. 7]
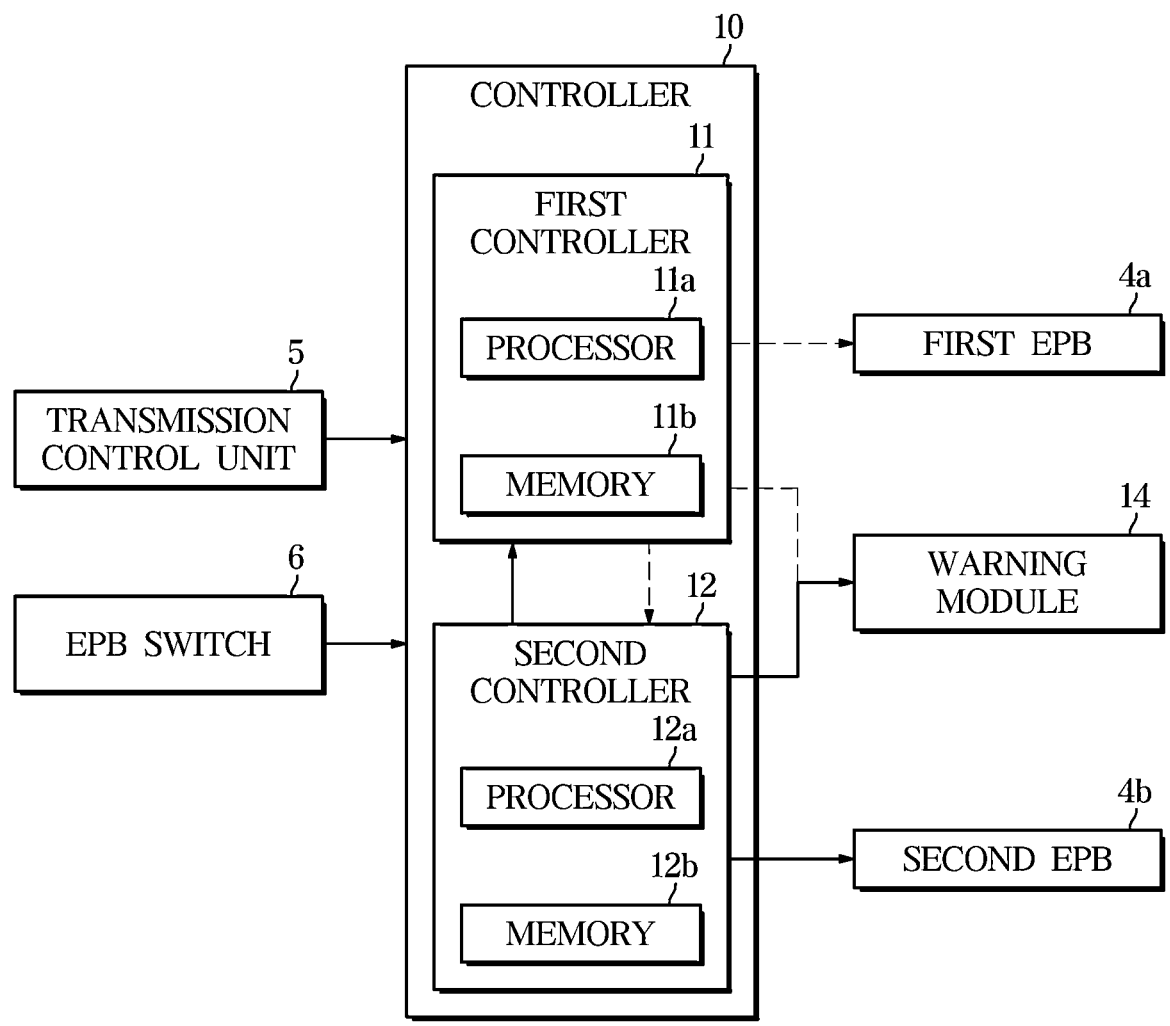

[FIG. 8]
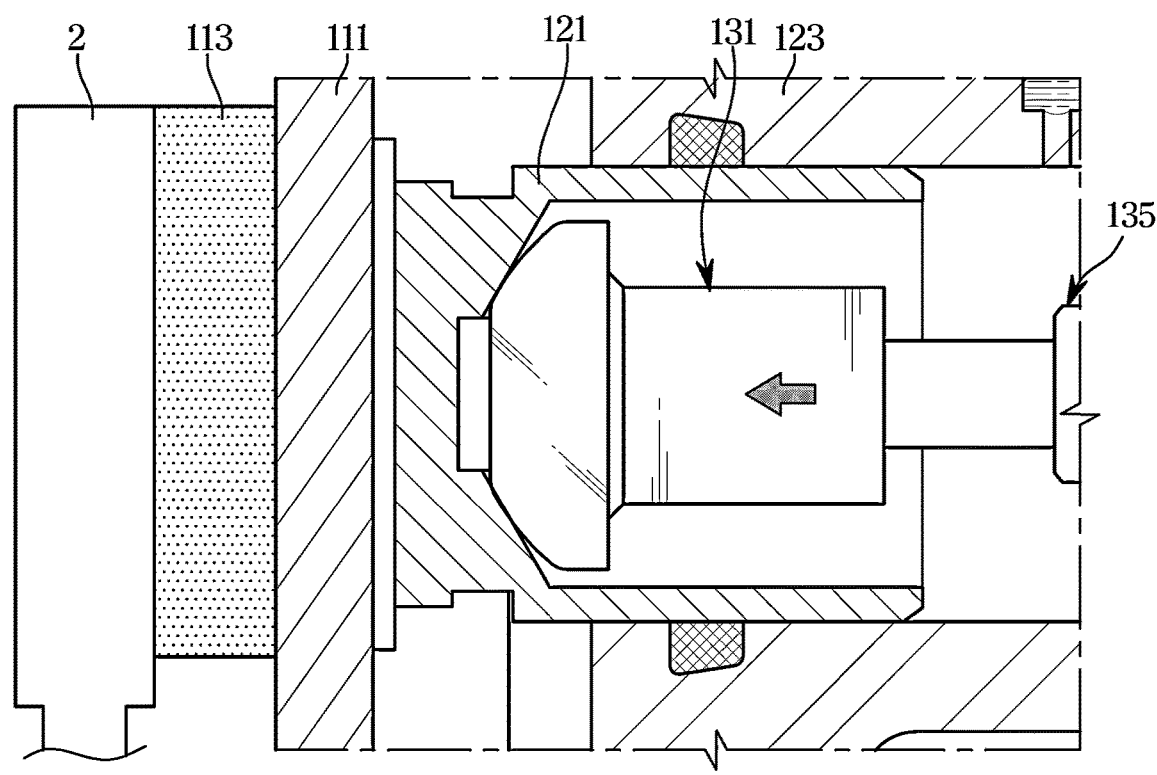

[FIG. 9]
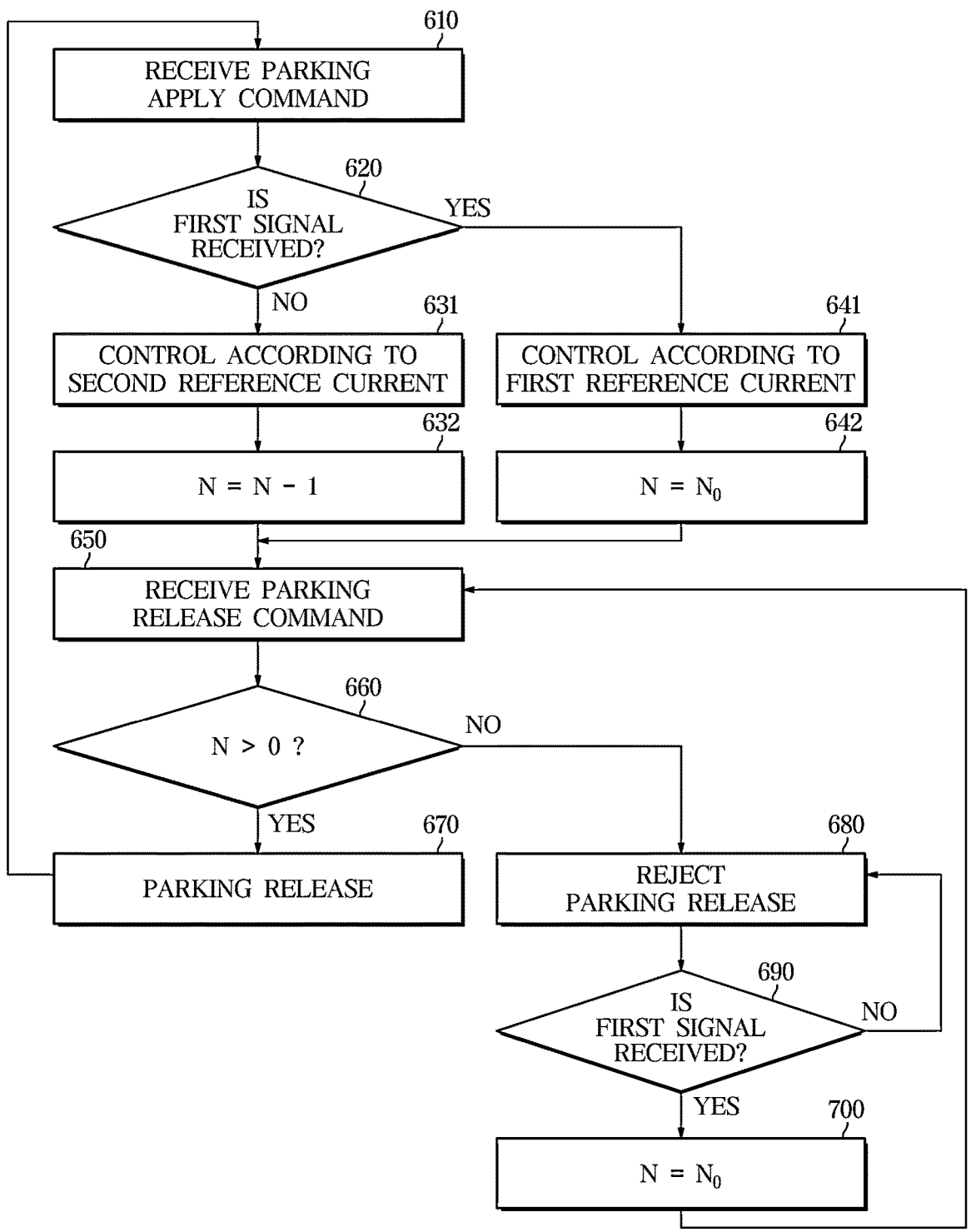

ELECTRONIC PARKING BRAKE SYSTEM AND SAFETY CONTROL METHOD THEREOF

CROSS-REFERENCE TO RELATED APPLICATION

This application is based on and claims priority under 35 U.S.C. § 119 to Korean Patent Application No. 10-2021-0144892, filed on Oct. 27, 2021 in the Korean Intellectual Property Office, the disclosure of which is incorporated herein by reference.

BACKGROUND

1. Technical Field

The disclosure relates to an electronic parking brake system and a safety control method thereof, and more specifically, to an electronic parking brake system that performs safety control when a controller of an electronic parking brake fails and a safety control method thereof.

2. Background Art

Conventionally, when a gear of a vehicle is shifted to a park (P) position, a parking pawl placed in a transmission is engaged to a parking gear, thereby stopping and securing the vehicle. Recently, however, the parking pawl that applies a significantly large loads on small components is removed and an electronic parking brake (EPB) provided in a vehicle, in particular, a Motor-on-Caliper (MoC)-type EPB system replaces the parking pawl.

During parking, the EPB system presses brake pads onto a disc, which rotates integrally with a vehicle wheel, by moving a piston forward by an electric motor, thereby generating a clamping force. Also, when parking is released, the generated clamping force is released by moving the piston backward by the electric motor and releasing the pressure of the brake pads from the brake disc.

Conventionally, a parked vehicle secured by both a parking pawl and a parking brake is prevented from sliding on a slope such as a hill. However, in a vehicle with a parking pawl removed, only an EPB secures the parked vehicle, and thus, the vehicle may slide when the EPB fails.

SUMMARY

An aspect of the disclosure provides an electronic parking brake system and a safety control method thereof that include two controllers, and when one of the two controllers fails, enable the other controller to control a parking brake with a higher clamping force than usual, thereby may improve safety during parking and reduce a load on the parking brake caused by the high clamping force.

Additional aspects of the disclosure will be set forth in part in the description which follows and, in part, will be obvious from the description, or may be learned by practice of the disclosure.

According to an aspect of the disclosure, there is provided an electronic parking brake system, including: a first electronic parking brake (EPB) including a first electric motor configured to provide a first braking torque to a first wheel of a vehicle; a second EPB including a second electric motor configured to provide a second braking torque to a second wheel of the vehicle; a first controller configured to control the first electric motor; and a second controller configured to control the second electric motor, wherein the first controller is configured to transmit a first signal to the second controller at predetermined intervals, and the second controller is configured to increase the second braking torque provided to the second wheel, based on the first signal not being received from the first controller.

The second controller is configured to transmit a second signal to the first controller at predetermined intervals, and the first controller is configured to increase the first braking torque provided to the first wheel, based on the second signal not being received from the second controller.

The second controller is configured to provide the second electric motor with a current corresponding to a predetermined clamping force, based on the first signal not being received, and the first controller is configured to provide the first electric motor with the current corresponding to the clamping force, based on the second signal not being received.

The second controller is configured to provide the second electric motor with a current corresponding to a predetermined clamping force only a limited number of times, based on the first signal not being received, and when the limited number of times is exceeded, reject a release of the second EPB.

The limited number of times is initialized when the second controller receives the first signal.

The electronic parking brake system further includes a warning module configured to warn of a malfunction of the first controller, wherein the second controller is configured to control the warning module to display a warning to a driver, based on the first signal not being received.

According to an aspect of the disclosure, there is provided a control method of an electronic parking brake system, the control method including: transmitting, by a first controller, a first signal to a second controller at predetermined intervals, the first controller controlling a first electric motor configured to provide a first braking torque to a first wheel of a vehicle, the second controller controlling a second electric motor configured to provide a second braking torque to a second wheel of the vehicle; and increasing, by the second controller, the second braking torque provided to the second wheel, based on the first signal not being received from the first controller.

The control method further includes: transmitting, by the second controller, a second signal to the first controller at predetermined intervals, and increasing, by the first controller, the first braking torque provided to the first wheel, based on the second signal not being received from the second controller.

The increasing of the second braking torque includes providing, by the second controller, the second electric motor with a current corresponding to a predetermined clamping force, based on the first signal not being received, and the increasing of the first braking torque includes providing, by the first controller, the first electric motor with the current corresponding to the clamping force, based on the second signal not being received.

The increasing of the second braking torque further includes providing, by the second controller, the second electric motor with a current corresponding to a predetermined clamping force only a limited number of times, based on the first signal not being received, and when the limited number of times is exceeded, rejecting a release of the second EPB.

The increasing of the second braking torque further includes initializing, by the second controller, the limited number of times when the second controller receives the first signal.

The control method further includes: controlling, by the second controller, a warning module configured to warn of a malfunction of the first controller, to display a warning to a driver, based on the first signal not being received.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 illustrates a vehicle to which an electronic parking brake system according to an embodiment is applied;

FIG. 2 illustrates an electronic parking brake applied to an electronic parking brake system according to an embodiment;

FIG. 3 illustrates a control block of an electronic parking brake system according to an embodiment;

FIG. 4 illustrates a vehicle to which an electronic parking brake system according to an embodiment is applied;

FIG. 5 illustrates a control block of an electronic parking brake system according to an embodiment;

FIG. 6 illustrates a method of controlling a clamping force of an electronic parking brake system according to an embodiment;

FIG. 7 illustrates a control block of an electronic parking brake system according to an embodiment;

FIG. 8 illustrates a parking operation of an electronic parking brake system according to an embodiment; and FIG. 9 illustrates a restricted parking release method of an electronic parking brake system according to an embodiment.

DETAILED DESCRIPTION

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may refer to at least one process processed by at least one hardware or software. According to embodiments, a plurality of "~part", "~member", "~module", "~block" may be embodied as a single element, or a single of "~part", "~member", "~module", "~block" may include a plurality of elements.

It will be understood that when an element is referred to as being "connected" to another element, it can be directly or indirectly connected to the other element, wherein the indirect connection includes "connection" via a wireless communication network.

It will be understood that the term "include" when used in this specification, specifies the presence of stated features, integers, steps, operations, elements, and/or components, but do not preclude the presence or addition of one or more other features, integers, steps, operations, elements, components, and/or groups thereof.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, an operation principle and embodiments will be described in detail with reference to the accompanying drawings.

FIG. 1 illustrates a vehicle to which an electronic parking brake system according to an embodiment is applied.

Referring to FIG. 1, a vehicle 1 is provided with left and right front wheels FL and FR and left and right rear wheels RL and RR.

Each of the wheels FL, FR, RL and RR is provided with a brake disc 2 rotating with a corresponding wheel.

The brake discs 2 of the left and right front wheels FL and FR may be provided with a braking force from brake calipers 3 operated by hydraulic pressure.

The brake discs 2 of the left and right rear wheels RL and RR may be provided with a braking force by electronic parking brake (EPB) 4.

A transmission control unit (TCU) 5 may be provided around a driver's seat of the vehicle 1 to receive a driver's intention of gear shift of the vehicle and control a transmission of the vehicle. The TCU 5 is provided to receive a user's gear manipulation such as parking P, reverse R, neutral N, drive D, and the like. The TCU 5 may receive a user's operation through various forms such as a gear stick, dial, button, etc. When receiving a user's operation for a parking gear P, the TCU 5 may transmit, to a controller 10, a signal corresponding to a parking apply command (an apply command). When receiving a user's operation for gears other than the parking gear, the TCU 5 may transmit, to the controller 10, a signal corresponding to a parking release command (a release command).

An EPB switch 6 may be provided around the driver's seat of the vehicle 1 to receive a driver's intention of operating the EPB 4. The EPB switch 6 is provided to be turned on or off by the driver. When turned on, the EPB switch 6 may transmit a signal corresponding to the parking apply command (an apply command) to the controller 10, and when turned off, the EPB switch 6 may transmit a signal corresponding to the parking release command (a release command) to the controller 10.

FIG. 2 illustrates an electronic parking brake applied to an electronic parking brake system according to an embodiment.

Referring to FIG. 2, the EPB 4 may include a carrier 110 on which a pair of pad plates 111 and 112 are installed movably in forward and backward directions to press the brake disc 2 that rotates with a wheel of a vehicle, a caliper housing 120 slidably installed on the carrier 110 and including a cylinder 123 in which a piston 121 is movably installed in forward and backward directions by braking hydraulic pressure, a power conversion unit 130 provided to press the piston 121, and a motor actuator 140 provided to deliver a rotational force to the power conversion unit 130 using the motor M.

The pair of pad plates 111 and 112 are divided into an inner pad plate 111 disposed to be in contact with the piston 121 and an outer pad plate 112 disposed to be in contact with a finger part 122 of the caliper housing 120. The pair of pad plates 111 and 112 are installed on the carrier 110 fixed to a vehicle body so that the pair of pad plates 111 and 112 may move toward both sides of the brake disc 2. Also, brake pads 113 are attached to one surface of each of the pair of pad plates 111 and 112 that face the brake disc 2.

The caliper housing 120 is slidably installed on the carrier 110. More specifically, the power conversion unit 130 is installed at a rear of the caliper housing 120, and the caliper housing 120 includes the cylinder 123 in which the piston 121 is movably installed in forward and backward directions and the finger part 122 bent in a lower direction to operate the outer pad plate 112. The finger part 122 and the cylinder 123 are integrally formed.

The piston 121 is provided in a cylindrical shape to have a u-shaped inside like a cup, and slidably inserted inside the cylinder 123. The piston 121 presses the inner pad plate 111 toward the brake disc 2 by an axial force of the power conversion unit 130 that receives the rotational force of the motor actuator 140. Accordingly, when the axial force of the power conversion unit 130 is applied, the piston 121 moves toward the inner pad plate 111, thereby pressing the inner pad plate 111. The caliper housing 120 operates in an opposite direction to the piston 121 by a reaction force, and thus the finger part 122 presses the outer pad plate 112 to the brake disc 2 side. Accordingly, braking may be performed.

The power conversion unit 130 may receive the rotational force form the motor actuator 140 and function to press the piston 121 to the inner pad plate 111 side.

The power conversion unit 130 may include a nut member 131, disposed inside the piston 121 to be in contact with the piston 121, and a spindle member 135 screwed to the nut member 131.

The nut member 131 is disposed inside the piston 121 in a state where rotation thereof is limited, and is screwed to the spindle member 135.

The nut member 131 may include a head portion 132 provided to be in contact with the piston 121, and an engagement portion 133 extending from the head portion 132 and in which a female screw thread is formed on an inner circumferential surface thereof in order to be screwed to the spindle member 135.

The nut member 131 moves forward or backward depending on a rotation direction of the spindle member 135, and may function to press the piston 121 or release the pressure on the piston 121. In this instance, the forward direction may be a movement direction in which the nut member 131 approaches the piston 121. The backward direction may be a movement direction in which the nut member 131 is away from the piston 121. In addition, the forward direction may be a movement direction in which the piston 121 approaches the brake pad 113. The backward direction may be a movement direction in which the piston 121 is away from the brake pad 113.

The spindle member 135 may include a shaft portion 136, which passes through a rear portion of the caliper housing 120 and rotates by receiving the rotational force of the motor actuator 140, and a flange portion 137 radially extending from the shaft portion 136. The shaft portion 136 may have one side which is rotatably installed and passes through a rear side of the cylinder 123, and the other side disposed inside the piston 121. In this instance, the one side of the shaft portion 136 that passes through the rear portion of the cylinder 123 is connected to an output shaft of a reducer 142 to receive the rotational force of the motor actuator 140.

The motor actuator 140 may include an electric motor 141 and the reducer 142.

The electric motor 141 moves the nut member 131 forward or backward by rotating the spindle member 135, thereby pressing the piston 121 or releasing the pressure on the piston 121.

The reducer 142 may be provided between an output side of the electric motor 141 and the spindle member 135.

Through the above configuration, when parking is performed, the EPB 4 may rotate the spindle member 135 in one direction using the motor actuator 140, thereby moving the nut member 131 and pressing the piston 121. The piston 121 pressed by the movement of the nut member 131 presses the inner pad plate 111, and thus the brake pad 113 comes into close contact with the brake disc 2, thereby may generate a clamping force.

Also, when parking is released, the EPB 4 may rotate the spindle member 135 in an opposite direction using the motor actuator 140, thereby moving the nut member 131 pressed by the piston 121 backward. The pressure on the piston 121 may be released by the backward movement of the nut member 131. Due to the release of the pressure on the piston 121, the brake pad 113 may be spaced apart from the brake disc 2, thereby may release the generated clamping force.

FIG. 3 illustrates a control block of an electronic parking brake system according to an embodiment.

Referring to FIG. 3, the electronic parking brake system may include the controller 10 performing overall control.

An input side of the controller 10 is electrically connected to the TCU 5 and the EPB switch 6.

An output side of the controller 10 is electrically connected to the EPB 4 and a warning module 14.

The EPB 4 may include a first EPB 4a and a second EPB 4b. The first EPB 4a may include a first electric motor 141a providing a first braking torque to a first wheel of a vehicle, and the second EPB 4b may include a second electric motor 141b providing a second braking torque to a second wheel of the vehicle.

For example, the first EPB 4a may be provided in a rear left wheel RL and generate a clamping force required for parking of the rear left wheel RL according to a control signal of the controller 10. The second EPB 4b may be provided in a rear right wheel RR and generate a clamping force required for parking of the rear right wheel RR according to a control signal of the controller 10.

The controller 10 may be referred to as an electronic control unit (ECU).

The controller 10 may perform a parking apply mode or a parking release mode according to an operation signal of the TCU 5, an operation signal of the EPB switch 6 operated by a driver, or an operation signal generated by a program related to operations of the EPB.

In the parking apply mode, the controller 10 may rotate the electric motor 141 of the EPB 4 in one direction, thereby moving the nut member 131 forward and pressing the piston 121. Accordingly, the brake pad 113 comes into close contact with the brake disc 2, thereby may perform a parking operation that generates a clamping force.

The controller 10 may include two controllers, i.e., a first controller 11 and a second controller 12. The first controller 11 controls the first electric motor 141a and the second controller 12 controls the second electric motor 141b.

The first controller 11 and the second controller 12 operate independently. Even when a malfunction occurs in the first controller 11, the second controller 12 may operate normally.

The first controller 11 may control a clamping force of the first EPB 4a by controlling a current supplied to the first electric motor 141a of the first EPB 4a.

The second controller 12 may control a clamping force of the second EPB 4b by controlling a current supplied to the second electric motor 141b of the second EPB 4b.

As such, by independently controlling the first EPB 4a and the second EPB 4b by the first controller 11 and the second controller 12, respectively, even when one of the controllers fails, the electronic parking brake system may be operated by the other controller, thereby securing stability of parking brake.

The first controller 11 may include a processor 11a and a memory 11b and the second controller 12 may include a processor 12a and a memory 12b.

Each of the memories 11b and 12b may store a program for processing or controlling of the processors 11a and 12a and various data for operating the electronic parking brake system.

Each of the memories 11b and 12b may include a volatile memory such as a static random access memory (S-RAM) and dynamic random access memory (D-RAM), and a non-volatile memory such as a flash memory, a read only memory (ROM), an erasable programmable read only memory (EPROM), and the like.

The processors 11a and 12a may control overall operations of the electronic parking brake system.

The warning module 14 may warn of a malfunction of the first controller 11 or the second controller 12.

FIG. 4 illustrates a vehicle to which an electronic parking brake system according to an embodiment is applied. FIG. 5 illustrates a control block of an electronic parking brake system according to an embodiment.

Referring to FIG. 4, the EPB 4 may provide a braking force to the brake discs 2 of all the left and right front wheels FL and FR and the left and right rear wheels RL and RR of the vehicle.

Referring to FIG. 5, the EPB 4 may include the first EPB 4a, the second EPB 4b, a third EPB 4c and a fourth EPB 4d. The first EPB 4a may be provided in a rear left wheel RL and generate a clamping force required for parking of the rear left wheel RL according to a control signal of the controller 10. The second EPB 4b may be provided in a rear right wheel RR and generate a clamping force required for parking of the rear right wheel RR according to a control signal of the controller 10. The third EPB 4c may be provided in a front right wheel FR and generate a clamping force required for parking of the front right wheel FR according to a control signal of the controller 10. The fourth EPB 4d may be provided in a front left wheel FL and generate a clamping force required for parking of the front left wheel FL according to a control signal of the controller 10.

In this instance, the first controller 11 may control a clamping force of the first EPB 4a and the third EPB 4c by controlling a current supplied to the electric motor 141a of the first EPB 4a and the electric motor 141c of the third EPB 4c.

The second controller 12 may control a clamping force of the second EPB 4b and the fourth EPB 4d by controlling a current supplied to the electric motor 141b of the second EPB 4b and the electric motor 141d of the fourth EPB 4d.

However, the first controller 11 and the second controller 12 are not limited thereto. Specifically, the first controller 11 may control a clamping force of the first EPB 4a and the fourth EPB 4d and the second controller 12 may control a clamping force of the second EPB 4b and the third EPB 4c, or the first controller 11 may control a clamping force of the first EPB 4a and the second EPB 4b and the second controller 12 may control a clamping force of the third EPB 4c and the fourth EPB 4d. That is, by dividing the plurality of EPBs 4 into two groups, the two controllers 11 and 12 may control a clamping force of each of the two groups.

As such, by independently controlling the plurality of EPBs 4 by the two controllers 11 and 12, even when one of the controllers fails, the electronic parking brake system may be operated by the other controller, thereby securing a stability of the EPBs.

FIG. 6 illustrates a method of controlling a clamping force of an electronic parking brake system according to an embodiment. FIG. 7 illustrates a control block of an electronic parking brake system according to an embodiment.

A method of controlling a clamping force by the first controller 11 is illustrated in a left side of FIG. 6, and a method of controlling a clamping force by the second controller 12 is illustrated in a right side of FIG. 6.

The first controller 11 transmits a first signal to the second controller 12 at predetermined intervals (510a), and the second controller 12 transmits a second signal to the first controller 11 at predetermined intervals (510b). As such, the first controller 11 and the second controller 12 may inform that each of the controllers 11 and 12 operates normally by transmitting the first and second signals at predetermined intervals, respectively. Accordingly, the first and second signals may function as an availability signal of each of the first controller 11 and the second controller 12.

The first controller 11 determines whether the second signal is received from the second controller 12 (520a), and the second controller 12 determines whether the first signal is received from the first controller 11 (520b). As such, whether an opposing controller normally operates may be determined by determining whether each of the first controller 11 and the second controller 12 receives a signal from an opposing controller after transmitting the signal.

In this instance, when it is determined that the second signal is received, the first controller 11 transmits the first signal to the second controller 12 again. Likewise, when it is determined that the first signal is received, the second controller 12 transmits the second signal to the first controller 11 again.

Meanwhile, based on the second signal not being received from the second controller 12, the first controller 11 increases a first braking torque provided to a first wheel (530a). Likewise, based on the first signal not being received from the first controller 11, the second controller 12 increases a second braking torque provided to a second wheel (530b).

In this instance, based on the second signal not being received, the first controller 11 provides the first electric motor 141a with a current corresponding to a predetermined clamping force. Based on the first signal not being received, the second controller 12 provides the second electric motor 141b with a current corresponding to a predetermined clamping force. In this instance, the predetermined clamping force is higher than a clamping force during normal operation, and may be set to a clamping force sufficient to provide a high braking torque to a wheel without significantly affecting the motor actuator 140 of the EPB 4.

Afterwards, the first controller 11 transmits the first signal to the second controller 12 at predetermined intervals again (510a), and the second controller 12 transmits the second signal to the first controller 11 at predetermined intervals again (510b).

The first controller 11 determines whether the second signal is received from the second controller 12 (540a), and the second controller 12 determines whether the first signal is received from the first controller 11 (540b).

In this instance, when it is not determined that the second signal is received, the first controller 11 transmits the first signal to the second controller 12 again. Likewise, when it is not determined that the first signal is received, the second controller 12 transmits the second signal to the first controller 11 again. In this instance, because the first controller 11 or the second controller 12 is incapable of receiving the second signal or the first signal, respectively, the first controller 11 or the second controller 12 repeatedly transmits the first signal or the second signal at predetermined intervals until the second signal or the first signal is received.

Meanwhile, based on the second signal being received from the second controller 12, the first controller 11 decreases the first braking torque provided to the first wheel (550*a*). Likewise, based on the first signal being received from the first controller 11, the second controller 12 decreases the second braking torque provided to the second wheel (550*b*).

When the second signal is not received, the first controller 11 increases the first braking torque (530*a*), and then when the second signal is received, the first controller 11 decreases the first braking torque (550*a*). When the first signal is not received, the second controller 12 increases the second braking torque (530*b*), and then when the first signal is received, the second controller 12 decreases the second braking torque (550*b*). As such, when the second signal or the first signal is not received, and then is received, the first controller 11 or the second controller 12 determines that an opposing controller operates normally because an error of the opposing controller is removed, and decreases a braking torque.

An example where a malfunction occurs in the first controller 11 is illustrated in FIG. 7. When a malfunction occurs in the first controller 11, the first signal may not be transmitted to the second controller 12. Also, the first EPB 4*a* controlled by the first controller 11 is incapable of operating.

When the first signal is not received, the second controller 12 may display a warning to a driver through the warning module 14. The driver may recognize that the malfunction occurs in the first controller 11 through the warning of the warning module 14, and take action.

Meanwhile, when the second signal is not received, the first controller 11 may display a warning to the driver through the warning module 14. That is, when a malfunction occurs in one of the first controller 11 or the second controller 12, the warning module 14 may display a warning to the driver under control of the first controller 11 or the second controller 12.

The warning module 14 may directly receive the first signal, transmitted by the first controller 11, and the second signal transmitted by the second controller 12. Accordingly, based on one of the first signal or the second signal not being received, the warning module 14 may detect a malfunction of the warning module 14 on its own, and display a warning to the driver.

Meanwhile, based on the first signal not being received, the second controller 12 increases a current supplied to the second electric motor 141*b* when the second EPB 4*b* operates, thereby generating, to the second EPB 4*b*, a clamping force higher than when receiving the first signal. Accordingly, the second braking torque provided to the second wheel increases.

As described above, when the first EPB 4*a* is incapable of operating due to the malfunction of the first controller 11, the second controller 12 increases the clamping force of the second EPB 4*b*, thereby increasing the second braking torque. Accordingly, even when the malfunction occurs in one of the controllers, the vehicle may be stably provided with a braking torque to secure the vehicle.

Likewise, when a malfunction occurs in the second controller 12, the first controller 11 increases a clamping force of the first EPB 4*a*, thereby increasing the first braking torque. Accordingly, the vehicle may be stably provided with a braking torque.

FIG. 8 illustrates a parking operation of an electronic parking brake system according to an embodiment.

A method of controlling the first EPB 4*a* by the first controller 11 is the same as a method of controlling the second EPB 4*b* by the second controller 12. Hereinafter, the first controller 11 and the second controller 12 are described as the controller 10 and the first EPB 4*a* and the second EPB 4*b* are described as the EPB 4 for convenience of description.

Referring to FIG. 8, in a parking apply mode, the controller 10 drives the electric motor 141 to move the nut member 131 forward.

The piston 121 is pressed by the forward movement of the nut member 131.

The inner pad plate 111 moves toward the brake disc 2 side due to the pressure of the piston 121, and thus the brake pad 113 provided in the inner pad plate 111 presses the brake disc 2.

When the nut member 131 reaches a parking apply position, the controller 10 stops the electric motor 141 to maintain the nut member 131 in the parking apply position.

The controller 10 determines whether a current position of the nut member 131 is in the parking apply position according to a current value flowing through the electric motor 141 when the piston 121 is pressed by the movement of the nut member 131.

When moving the nut member 131 forward by driving the electric motor 141, while the nut member 131 is spaced apart from the piston 121, the small amount of current is flowing through the electric motor 141. However, when the nut member 131 comes into close contact with and presses the piston 121, the amount of current flowing through the electric motor 141 is drastically increased. As such, when the current flowing through the electric motor 141 is greater than a preset reference current, it may be determined that the piston 121 is maximally pressed by the movement of the nut member 131. A position of the nut member 131 at the moment may be the parking apply position.

In this instance, a clamping force at the parking apply position may vary depending on the preset reference current. When a reference current is set high, the current flowing through the electric motor 141 may reach the reference current, only after a clamping force reaches a predetermined level due to the piston 121 pressed by the forward movement of the nut member 131 by driving the electric motor 141. That is, when the driving of the electric motor 141 is stopped after reaching the reference current, parking is made in a state where a clamping force applied to the brake disc 2 through the piston 121 is high.

By contrast, when the reference current is set low, the current flowing through the electric motor 141 may reach the reference current, even when the piston 121 is slightly pressed by the nut member 131 by driving the electric motor 141. That is, when the driving of the electric motor 141 is stopped after reaching the reference current, parking is made in a state where a clamping force applied to the brake disc 2 through the piston 121 is low.

The first controller 11 or the second controller 12 may perform a parking operation according to a predetermined first reference current, while receiving the first signal or the second signal from an opposing controller. The first reference current may be set to a current corresponding to a clamping force capable of stably securing the vehicle when all the EPB 4 operates normally.

Meanwhile, when the first signal or the second signal may not be received from an opposing controller due to a malfunction of one of the first controller 11 or the second controller 12, the first controller 11 or the second controller 12 may perform a parking operation according to a predetermined second reference current. The second reference current may be set to a current corresponding to a clamping force capable of securing the vehicle when a portion of the EPB 4 is incapable of operating due to a malfunction of one of the first controller 11 or the second controller 12. In this instance, the second reference current may be higher than the first reference current. That is, when the second signal is not received, the first controller 11 may control the first EPB 4a according to the second reference current, and thus parking is made with a clamping force higher than a clamping force during normal operation, and a braking torque provided to the first wheel increases. Accordingly, in a parking apply mode, even when a braking torque is not applied to the second wheel due to a malfunction of the second controller 12, the increased braking torque is applied to the first wheel, thereby stably performing a parking operation. However, when the parking operation continues according to the second reference current, an error may occur in the actuator 140 of the EPB 4 due to the high clamping force. Accordingly, when the first signal or the second signal is normally received, the parking operation may be controlled according to the first reference current, and only when the first signal or the second signal may not be received, the parking operation may be controlled according to the second reference current.

In a parking release mode, the controller 10 rotates the electric motor 141 of the EPB 4 in an opposite direction, thereby moving the nut member 131 backward and releasing the pressure on the piston 121. Accordingly, the brake pads 113 in close contact with the brake disc 2 may be spaced apart from the brake disc 2, thereby performing a parking release operation for releasing the generated clamping force.

FIG. 9 illustrates a restricted parking release method of an electronic parking brake system according to an embodiment.

Based on a second signal not being received, the first controller 11 may provide the first electric motor 141a with a current corresponding to a predetermined clamping force only the limited number of times. Likewise, based on a first signal not being received, the second controller 12 may provide the second electric motor 141b with a current corresponding to a predetermined clamping force only the limited number of times.

The first controller 11 that does not receive the second signal or the second controller 12 that does not receive the first signal controls the first electric motor 141a or the second electric motor 141b according to a second reference current, respectively. In this instance, when the electric motor 141 is repeatedly controlled according to the second reference current higher than usual, an error may occur in the actuator 140 due to a high clamping force. Accordingly, the first controller 11 or the second controller 12 controls the electric motor 141 according to the second reference current only the limited number of times. When the limited number of times is exceeded, the first controller 11 or the second controller 12 may reject a release of the first EPB 4a or the second EPB 4b and hold a parked state.

Detailed operations are described with reference to FIG. 9. The operations shown in FIG. 9 are performed by the second controller 12, which is the same as the operations performed by the first controller 11 except for receiving a first signal (in operation 620 and operation 690). The operation of receiving the first signal replaces with an operation of receiving a second signal, when performed by the first controller 11.

The second controller 12 receives a parking apply command from the TCU 5 or the EPB switch 6 (610).

The second controller 12 receiving the parking apply command determines whether a first signal is received from the first controller 11 (620).

When the first signal is not received, the second controller 12 controls the second electric motor 141b according to a second reference current higher than usual to perform a parking apply mode (631). Accordingly, the second electric motor 141b applies a predetermined clamping force to the brake disc 2.

The second controller 12 subtracts one from the remaining number of operations N after performing the parking apply mode (632). An initial value of the remaining number of operations N is the predetermined limited number of times $N_0$. Also, the remaining number of operations N is subtracted by one each time the parking apply mode is performed without receiving the first signal.

In this instance, the limited number of times may be initialized when the second controller 12 receives the first signal. Receiving the first signal by the second controller 12 indicates that the first controller 11 operates normally again. Accordingly, the second controller 12 controls the second electric motor 141b according to a first reference current again, and initializes the limited number of times to perform a parking release mode.

When the second controller 12 receiving the parking apply command receives the first signal, the second controller 12 controls the second electric motor 141b according to the first reference current and performs the parking apply mode (641). Afterwards, the second controller 12 initializes the remaining number of operations N to the predetermined limited number of times $N_0$ (642).

The second controller 12 receives a parking release command from the TCU 5 or the EPB switch 6 (650).

The second controller 12 receiving the parking release command determines whether the remaining number of operations N is left (660).

When the remaining number of operations N is left (N>0), the second controller 12 controls the second electric motor 141b and performs a parking release operation (670).

However, when the remaining number of operations N is not left (N≤0), the second controller 12 rejects the parking release operation of the second electric motor 141b (680) in order to prevent the actuator 140 of the second EPB 4b from being damaged due to repeated operations with a high clamping force.

However, the second controller 12 continuously determines whether the first signal is received from the first controller 11 (690), and when receiving the first signal, the second controller 12 initializes the remaining number of operations N to the predetermined limited number of times $N_0$ (700).

When receiving the parking release command (650) after the remaining number of operations N is initialized, because the remaining number of operations N is left (N=$N_0$) (660), the second controller 12 controls the second electric motor 141b and performs the parking release operation (670).

As is apparent from the above, according to the embodiments of the disclosure, the electronic parking brake system can respectively control two or more EPBs through two controllers, and thus even when one of the controllers fails, an EPB is capable of operating, and safety can be enhanced.

In the electronic parking brake system according to the embodiments of the disclosure, the two controllers can respectively determine whether an opposing controller malfunctions, and when the opposing controller's malfunction occurs, a braking torque provided through an EPB can increase, thereby preventing a parked vehicle from sliding.

According to the embodiments of the disclosure, the electronic parking brake system can increase a braking torque only when a controller's malfunction occurs, thereby can minimize an actuator damage caused by a high clamping force.

According to the embodiments of the disclosure, the electronic parking brake system can generate a clamping force only the limited number of times when a controller's malfunction occurs, thereby can minimize an actuator damage caused by repeated operations in a high clamping force.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. An electronic parking brake system, comprising:
    a first electronic parking brake (EPB) comprising a first electric motor configured to provide a first braking torque to a first wheel of a vehicle;
    a second EPB comprising a second electric motor configured to provide a second braking torque to a second wheel of the vehicle;
    a first controller configured to control the first electric motor; and
    a second controller configured to control the second electric motor,
    wherein the first controller is configured to transmit a first signal to the second controller at first predetermined intervals, and
    the second controller is configured to control the second electric motor to increase the second braking torque provided to the second wheel, based on the first signal not being received from the first controller.

2. The electronic parking brake system of claim 1, wherein the second controller is configured to transmit a second signal to the first controller at second predetermined intervals, and the first controller is configured to increase the first braking torque provided to the first wheel, based on the second signal not being received from the second controller.

3. The electronic parking brake system of claim 2, wherein the second controller is configured to provide the second electric motor with a current corresponding to a predetermined clamping force, based on the first signal not being received, and
    the first controller is configured to provide the first electric motor with the current corresponding to the predetermined clamping force, based on the second signal not being received.

4. The electronic parking brake system of claim 1, wherein the second controller is configured to provide the second electric motor with a current corresponding to a predetermined clamping force only a limited number of times, based on the first signal not being received, and
    when the limited number of times is exceeded, reject a release of the second EPB.

5. The electronic parking brake system of claim 4, wherein the limited number of times is initialized when the second controller receives the first signal.

6. The electronic parking brake system of claim 1, further comprising:
    a warning circuit configured to warn of a malfunction of the first controller,
    wherein the second controller is configured to control the warning circuit to display a warning to a driver, based on the first signal not being received.

7. A control method of an electronic parking brake system, the control method comprising:
    transmitting, by a first controller, a first signal to a second controller at first predetermined intervals, the first controller controlling a first electric motor of a first electronic parking brake (EPB) configured to provide a first braking torque to a first wheel of a vehicle, the second controller controlling a second electric motor of a second EPB configured to provide a second braking torque to a second wheel of the vehicle; and
    controlling, by the second controller, the second electric motor to increase the second braking torque provided to the second wheel, based on the first signal not being received from the first controller.

8. The control method of claim 7, further comprising:
    transmitting, by the second controller, a second signal to the first controller at second predetermined intervals, and
    increasing, by the first controller, the first braking torque provided to the first wheel, based on the second signal not being received from the second controller.

9. The control method of claim 8, wherein the increasing of the second braking torque comprises providing, by the second controller, the second electric motor with a current corresponding to a predetermined clamping force, based on the first signal not being received, and
    the increasing of the first braking torque comprises providing, by the first controller, the first electric motor with the current corresponding to the predetermined clamping force, based on the second signal not being received.

10. The control method of claim 7, wherein the increasing of the second braking torque further comprises providing, by the second controller, the second electric motor with a current corresponding to a predetermined clamping force only a limited number of times, based on the first signal not being received, and when the limited number of times is exceeded, rejecting a release of the second EPB.

11. The control method of claim 10, wherein the increasing of the second braking torque further comprises initializing, by the second controller, the limited number of times when the second controller receives the first signal.

12. The control method of claim 7, further comprising:
    controlling, by the second controller, a warning circuit configured to warn of a malfunction of the first controller, to display a warning to a driver, based on the first signal not being received.

* * * * *